US008302169B1

(12) United States Patent
Presotto et al.

(10) Patent No.: US 8,302,169 B1
(45) Date of Patent: Oct. 30, 2012

(54) PRIVACY ENHANCEMENTS FOR SERVER-SIDE COOKIES

(75) Inventors: David Leo Presotto, Palo Alto, CA (US); Michal P. Szymaniak, Mountain View, CA (US); James F. Keller, Sunnyvale, CA (US); Mark Klenk, Saratoga, CA (US)

(73) Assignee: Google Inc., Mountain View, CA (US)

( * ) Notice: Subject to any disclaimer, the term of this patent is extended or adjusted under 35 U.S.C. 154(b) by 746 days.

(21) Appl. No.: 12/399,754

(22) Filed: Mar. 6, 2009

(51) Int. Cl.
*G06F 7/04* (2006.01)
(52) U.S. Cl. ............... 726/5; 713/155; 726/18; 726/19
(58) Field of Classification Search .................. 713/155
See application file for complete search history.

(56) References Cited

U.S. PATENT DOCUMENTS

| | | | |
|---|---|---|---|
| 6,047,268 A * | 4/2000 | Bartoli et al. .................. 705/35 |
| 6,986,047 B2 * | 1/2006 | Giles et al. .................... 713/175 |
| 7,082,532 B1 | 7/2006 | Vick et al. ..................... 713/155 |
| 7,970,934 B1 * | 6/2011 | Patel ............................. 709/244 |
| 2002/0073327 A1 | 6/2002 | Vellandi |
| 2003/0149900 A1 | 8/2003 | Glassman et al. ........... 713/202 |
| 2006/0168509 A1 | 7/2006 | Boss et al. |
| 2007/0106748 A1 | 5/2007 | Jakobsson et al. |
| 2007/0124805 A1 * | 5/2007 | Zhou et al. ...................... 726/5 |
| 2007/0299928 A1 | 12/2007 | Kohli et al. ................... 709/217 |
| 2010/0146582 A1 * | 6/2010 | Jaber et al. ....................... 726/1 |

FOREIGN PATENT DOCUMENTS

KR   2003-0016073   2/2003

OTHER PUBLICATIONS

Diament, et al., "The Dual Receiver Cryptosystem and Its Applications,"ACM, Oct. 25-29, 2004, pp. 330-343.

* cited by examiner

*Primary Examiner* — Kaveh Abrishamkar
(74) *Attorney, Agent, or Firm* — Morgan, Lewis & Bockius LLP

(57) ABSTRACT

A server system receives requests from client systems and sends responses back to the client systems. For a subset of the requests, in addition to responding to a request from a client system, the method includes creating a cryptographic object at the server system. The cryptographic object is used to cryptographically protect information related to the request, and the cryptographically protected information associated with the cryptographic object is stored at the server system. The server system then sends the cryptographic object to the client system, and in conjunction with sending the cryptographic object to the client system, irreversibly modifies the cryptographic object on the server system. For example, in some embodiments the cryptographic object includes an cryptographic key, and the server system deletes or truncates the only instances of the cryptographic object on the server system when the server system finishes responding to the request from the client system.

25 Claims, 8 Drawing Sheets

PRIVACY ENHANCEMENTS FOR SERVER-SIDE COOKIES

TECHNICAL FIELD

The disclosed embodiments relate generally to the field of client-server computer network systems, and in particular, to systems and methods for protecting the confidentiality of user-specific information and enhancing cookie security in client-server computer network systems.

BACKGROUND

People access more and more information through Internet services. On many occasions such services store data, such as user interface settings, about their users in order to serve them better. Storing more data about a user enables the service to provide a better experience to that user, as the service operation can then be better tailored to that user's needs, preferences, and expectations. Storing data about a user, however, can lead to various issues, such as security and privacy concerns.

It would be desirable for Internet services to strongly protect the security and privacy of user information while improving the user experience by storing additional user-specific information. To achieve these goals, such services should be capable of storing arbitrarily large amounts of data associated with a user while ensuring that the data related to a particular user can be accessed only while servicing requests from that user.

SUMMARY

According to a first aspect of the present invention, a server system receives requests from client systems and sends responses back to the client systems. For a subset of the requests, in addition to responding to a request from a client system, the method includes creating a cryptographic object at the server system. The cryptographic object is used to cryptographically protect information related to the request, and the cryptographically protected information associated with the cryptographic object is stored at the server system. The server system then sends the cryptographic object to the client system, and in conjunction with sending the cryptographic object to the client system, irreversibly modifies the cryptographic object on the server system. For example, in some embodiments the cryptographic object includes an cryptographic key, and the server system deletes or truncates the only instance(s) of the cryptographic object on the server system when the server system finishes responding to the request from the client system.

According to a second aspect of the invention, the server system receives a request from a client system, the request including a cryptographic object, and processes the request by identifying, at the server system, cryptographically protected information associated with the cryptographic object. The server system accesses the cryptographically protected information using the cryptographic object, and data based at least in part on the cryptographically protected information is sent to the client system. In conjunction with completing processing of the request, the cryptographic object on the server system is irreversibly modified. In some embodiments irreversibly modifying the cryptographic object includes deleting at least a portion of the cryptographic object from the server system; this irreversible modification may be performed in accordance with a predefined privacy policy. According to some embodiments, the cryptographic object includes a unique identifier and a cryptographic key and may also include version information.

According to a third aspect of the invention, the cryptographic object includes a version identifier, and a remedial action is performed when the version identifier in a cryptographic object received from the client system does not match a corresponding version value (for that cryptographic object) stored in the server system.

According to a fourth aspect of the invention, the server system receives from a first client system a first request having a first cryptographic object and receives from a second client system, distinct from the first client system, a second request having a second cryptographic object. The server system determines whether the first cryptographic object and the second cryptographic object both correspond to (the same) first cryptographically protected information. When the first cryptographic object and the second cryptographic object both correspond to the first cryptographically protected information, the server system performs a remedial operation on the first cryptographically protected information. In some embodiments the remedial operation is to delete the first cryptographically protected information. In other embodiments the remedial operation is to replicate the first cryptographically protected information to produce second cryptographically protected information and to associate the second cryptographically protected information with an updated cryptographic object that is distinct in value from the first and second cryptographic objects. In some embodiments the updated cryptographic object has a distinct unique identifier, and may also have a distinct cryptographic key from the first cryptographic object. In some embodiments the updated cryptographic object is sent to only one of the two client systems (e.g., to the second client system, but not to the first client system).

DESCRIPTION OF EMBODIMENTS

In one embodiment of the invention, a user interacts with a website (e.g., to access an online service) using a web browser on a client system. User-specific information about the user is collected by a server system based on the user's interactions with the website. A cryptographic object is created by the server system. The user-specific information is cryptographically protected and then stored by the server system using a cryptographic object. The cryptographic object may then be sent to the client system, and in conjunction with sending the cryptographic object to the client system, the instance(s) of the cryptographic object on the server system are irreversibly modified. Once the cryptographic object on the server system has been irreversibly modified, the server system is unable able to access the cryptographically protected data, thus protecting the privacy of the user. At a later point in time, the user may interact with the website again and send a request to the server including the cryptographic object. The server system may use the cryptographic object supplied by the user to access the cryptographically protected information and send the user a response based at least in part on the cryptographically protected information. Again, in conjunction with sending this response the cryptographic object may be irreversibly modified. Once the response has been sent and the cryptographic object has been irreversibly modified, the server system will no longer have access to the cryptographically protected user-specific information, protecting the privacy of the user.

Figure 1:
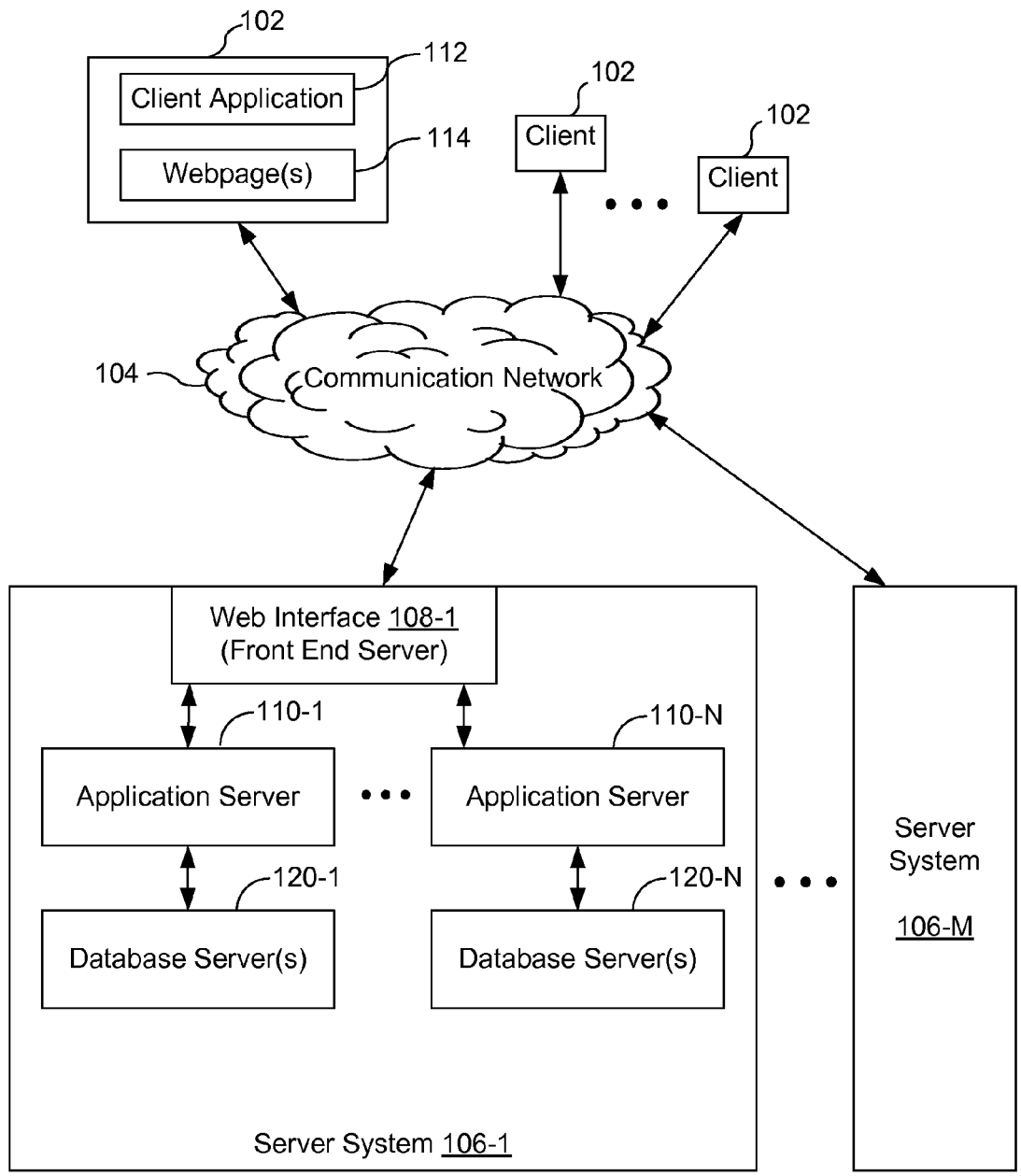
FIG. 1 is a block diagram illustrating the infrastructure of a client-server distributed system in accordance with some embodiments.

FIG. 1 is a block diagram illustrating the infrastructure of a client-server distributed system according to some embodiments of the invention. The distributed system includes a plurality of client systems 102 and a plurality of server systems 106. These components are linked together through one or more communication networks 104 (e.g., the Internet, other wide area networks, local area networks, etc.) so that the various components can communicate with each other. In some embodiments, each of the server systems 106 is a single server. In other embodiments a server system 106 includes a plurality of servers such as a web interface (front end server) 108, one or more application servers 110 and one or more database servers 120 which are connected to each other through a local area network (LAN) and exchange information with the client systems 102 through a common interface (e.g., one or more web servers, also called front end servers). In embodiments having a plurality of server systems 106, the server systems 106 may be connected to each other through a local area network (LAN) or other communication network.

A client system 102 includes a client application 112 (e.g., a web browser). A user can use the web browser to download one or more webpages 114 from the server systems 106. The client system 102 (sometimes called the "client device" or "client computer") may be any computer or similar device that is capable of receiving webpages from and sending requests (e.g., webpage requests, search queries, information requests, login requests, etc.) to the server system 106. Examples of client devices include, without limitation, desktop computers, notebook computers, tablet computers, mobile devices such as mobile phones and personal digital assistants, and set-top boxes. In the present application, the term "webpage" means virtually any document or content of any format including, but not limited to, text, image, audio, video, etc., that may be used by a web browser or other client application programs.

Requests from a client system may be conveyed to a respective server system 106 using the HTTP protocol, using http requests. When the client system stores a cookie (herein sometimes called a client-side cookie) corresponding to the website to which the request is being sent, the cookie (i.e., a copy of the cookie) is conveyed to the website along with the http request.

A server system 106 includes at least a web interface (front end server) 108 and an application server 110. The web interface 108 parses requests from the client systems 102, fetches corresponding webpages from the application server 110 and returns the webpages to the requesting client systems 102. Depending upon their respective locations in the topology of the client-server system, the web interface 108 and the application server 110 are also referred to as, respectively, a "front end server" and a "back end server" in some embodiments. In the present application, the terms "web interface" and "front end server" are used interchangeably. In some other embodiments, the front end server 108 and the back end server 110 are merged into one software application or one server system.

In some embodiments, the server systems 106 are deployed over multiple computers (represented by N application servers and N database servers in FIG. 1) so as to provide different types of services, such as search engine services, email services, map services, and the like. The number of computers or servers in a respective server system 106 may be an integer greater than 1. In some other embodiments, one individual type of service may also be distributed among multiple computer servers. For example, consider a system in which application server 110-1 is a search engine. User-specific information (e.g., user profiles, user preferences, search history, personal information submitted by the user) received by the application server 110-1 may be stored in multiple database servers 120 or multiple data storage devices accessible to the database server 120. Application servers 110 may be connected to one or more database servers 120. In some embodiments a single application server 110 may be connected to a single database server 120 (such as where information stored in the database server is needed only by the single application server), while in other embodiments multiple application servers 110 may be connected to a single database server 120 (such as where a small amount of information is used by a number of application servers 110 and the information is updated frequently), in other embodiments multiple application servers 110 may be connected to multiple database servers 120 (such as where a large amount of data is stored and needed by a large number of application servers 110).

One example of the interrelation between the servers in server system 106-1 is where the application server 110-1 is a search engine. In this embodiment, upon receipt of a new search request including one or more query terms, the front end server 108-1 parses the search request, submits the query terms to the application server 110-1, and then waits for the application server 110-1 to return a search result. The application server 110-1 queries its database or a database on a database server 120-1 for webpages most relevant to the query terms and returns a search result including links to the most relevant webpages to the front end server 108-1, which then forwards the search result to the requesting client system 102.

In this search engine embodiment, in order to provide better service to the user, the application server 110-1 may personalize a search result using user-specific information (e.g., user profiles, user preferences, search history, and other personal information stored by the database server(s) 120). As described in greater detail below with respect to FIG. 2, user-specific information may be stored in a cryptographically protected form. The cryptographically protected information may be accessed only when a user sends a request to the server system 106 with a cryptographic object associated with the cryptographically protected information. Once the server system 106-1 has received a particular cryptographic object, the application server 110-1 may identify the associated cryptographically protected information and use the cryptographic object to access the user-specific information to personalize the search result corresponding to the user (e.g., by reordering the search results so as to bring to the top, or place closer to the top of the search results, those search results most likely to be relevant or of interest to the user). In this way, a user may be provided with the added benefit of more relevant results while the privacy of user-specific information is maintained.

Note that the term "user" in this description actually refers to a web browser instance running on a client computer, not a human being. When two or more persons use the same browser instance, they share the same user identifier. However, since most browser instances are used by only one person, in most cases a user identifier corresponds to a single human user. Technically, though, whenever the term "user" appears in this document, one could instead use the term "client" (noting, however, that the term "client" corresponds to a browser instance and not to a client device or client system, because a client device or client system may host multiple browser instances).

Figure 2:
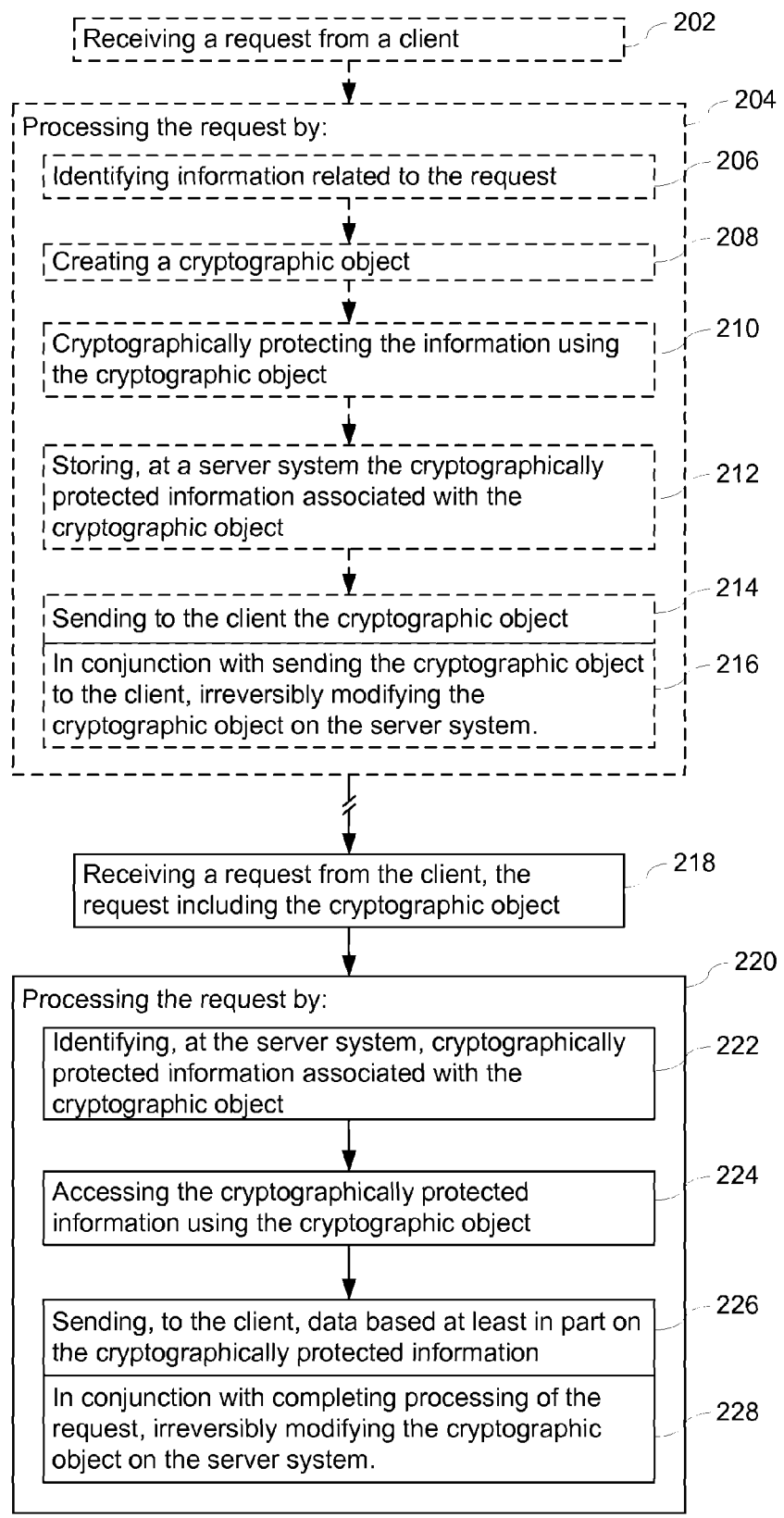
FIG. 2 is a flow diagram illustrating a method for enhancing the privacy of server-side cookies in accordance with some embodiments.

Attention is now directed to FIG. 2, which is a flow diagram illustrating a method for enhancing the privacy of server-side cookies in accordance with some embodiments. In some embodiments a request is received at a server system from a user at a client system (202). The server system may perform a series of steps to process the request (204). In some embodiments these steps include identifying information related to the request (206). This information may be user-specific information (e.g., user profiles, user preferences, search history, and other personal information). The server system may then create a cryptographic object (208). As discussed in greater detail below with reference to FIG. 5, in some embodiments this cryptographic object is a cryptographic key, while in other embodiments the cryptographic object may include a cryptographic key as well as other information such as version information and a unique identifier. The server system may then cryptographically protect the information (e.g., user-specific information) using the cryptographic object (210). In some embodiments the server system stores the cryptographically protected information associated with the cryptographic object (212) on the server system. This cryptographically protected information may be stored in a database in the application server 110 (FIG. 1) or in a database in a separate database server 120 (FIG. 1). Additionally, in one embodiment the server system sends the cryptographic object to the client system 102 (214) and, in conjunction with sending the cryptographic object to the client system 102, the server system 106 may irreversibly modify the cryptographic object on the server system (216), as described in greater detail below.

In some embodiments irreversibly modifying the cryptographic object is performed in accordance with a predefined privacy policy. The privacy policy may have been created by the owner of the server-system for the purpose of protecting sensitive user-specific information, such as search history, social security numbers, credit card numbers or other information sent to the server system 106 (FIG. 1) by a user. In order to protect user-specific information, the privacy policy may indicate that all user-specific information stored on the server system 106 or accessible by the server system 106 be encrypted using one or more cryptographic objects. In some embodiments only user-specific information that is particularly sensitive will be required to be encrypted or deleted by a privacy policy. The privacy policy may identify the types of information that are considered to be particularly sensitive. The privacy policy may further specify that cryptographic objects are to be irreversibly modified (i.e., not maintained on the server system in a useable form, as described in greater detail below) in conjunction with completing an operation in which the key was used or in conjunction with ending a session with a client if the operation is part of a longer session. In some embodiments the key is irreversibly modified immediately (i.e., simultaneously as the cryptographic object is sent to a user). In some embodiments the key is irreversibly modified within a predefined time period (e.g., within 1 second) after the cryptographic object has been sent to a user.

As used herein, the term irreversibly modify refers to rendering a decryption object (e.g., an object containing at least a cryptographic key) unusable for decrypting cryptographically protected information. Examples of irreversibly modifying a cryptographic object include without limitation: deleting all instances of the cryptographic object stored in the server system, deleting a portion of (the only instance of) the cryptographic key (this is sometimes called "truncating the cryptographic key"), encrypting the cryptographic object and truncating the encrypted cryptographic object, processing the cryptographic object using a one way hash function and then storing only the resulting hash value (and deleting all instances of the cryptographic object stored in the server system), or any other method that renders the cryptographic object unusable for accessing (e.g., decrypting) the cryptographically protected information. In some embodiments, a cryptographic key is extracted from the cryptographic object and irreversibly modified by truncating the cryptographic key. The truncated cryptographic key may then be used in place of the truncated cryptographic object for purposes of logging transactions as described in greater detail below. In some embodiments the privacy policy may also specify the deletion other information on the server system such as: the unencrypted or decrypted user-specific information that was used by the server system to generate a response to the user request, other user-specific information generated by the server system 106 or sent from the client to the server system 106.

A new request is received at the server system from the client system 102, the request including the cryptographic object (218). The server system performs a series of operations to process the new request (220). These operations include identifying, at the server system, the cryptographically protected information associated with the cryptographic object (222). The server system may then access the cryptographically protected information using the cryptographic object that was received from the client system 102 (224). In some embodiments, the cryptographic object includes an identifier that uniquely identifies the cryptographically protected information, and this identifier is then used to access the cryptographically protected information. The cryptographically protected information may include user-specific information, the privacy of which is protected by storing in encrypted form on the server system. Accessing the cryptographically protected information will typically include decrypting it using a cryptographic key obtained from the cryptographic object. The server system then processes the new request and the cryptographically protected information (now decrypted) and sends data to the client system 102 based at least in part on the cryptographically protected information (226). In conjunction with completing processing the new request, the server system may irreversibly modify the cryptographic object on the server system (228), as described in greater detail above.

Figure 3A:
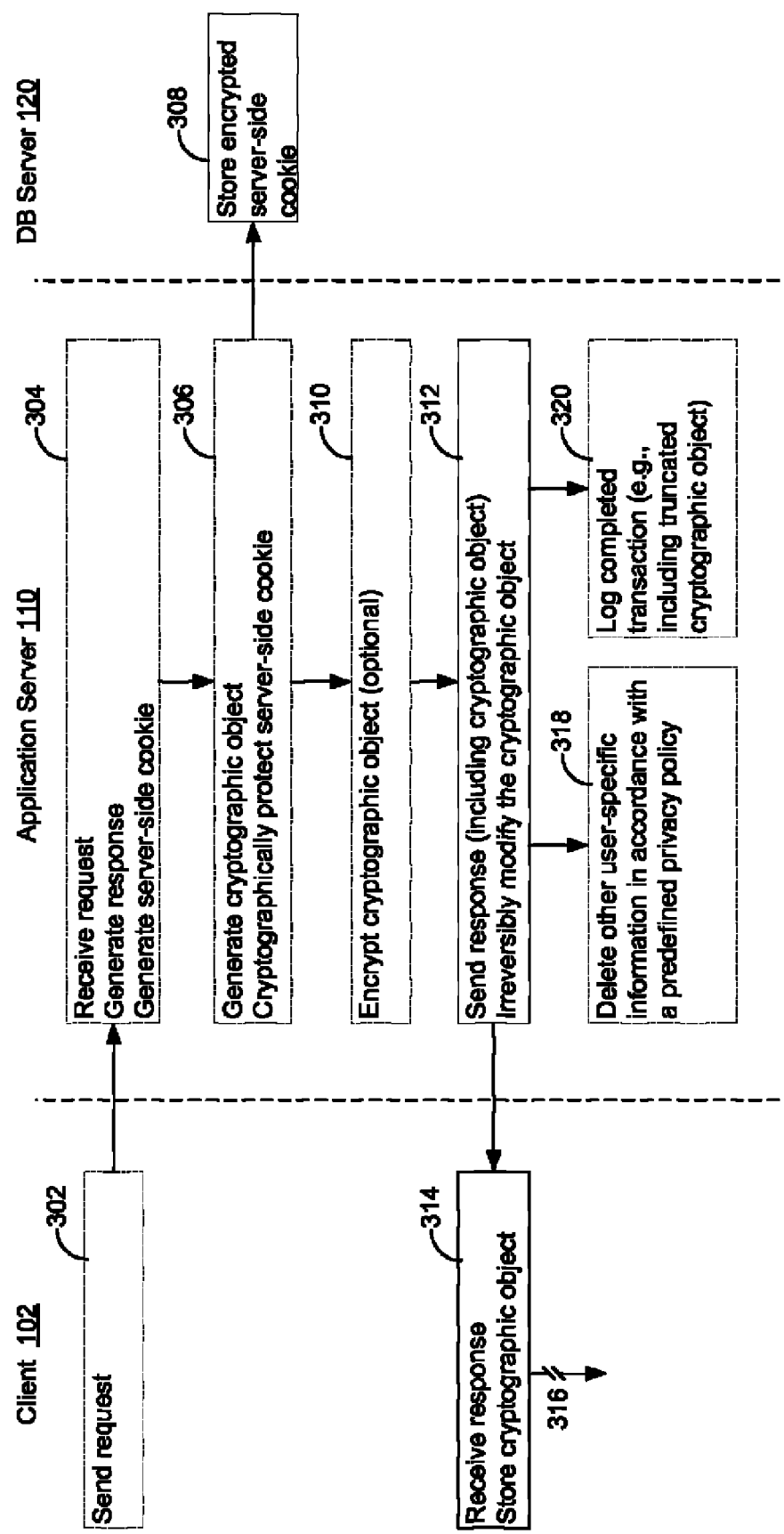
FIGS. 3A and 3B depict a flow diagram illustrating client and server roles in a process for cryptographically protecting user-specific information and accessing the cryptographically protected data in accordance with some embodiments.
Figure 3B:
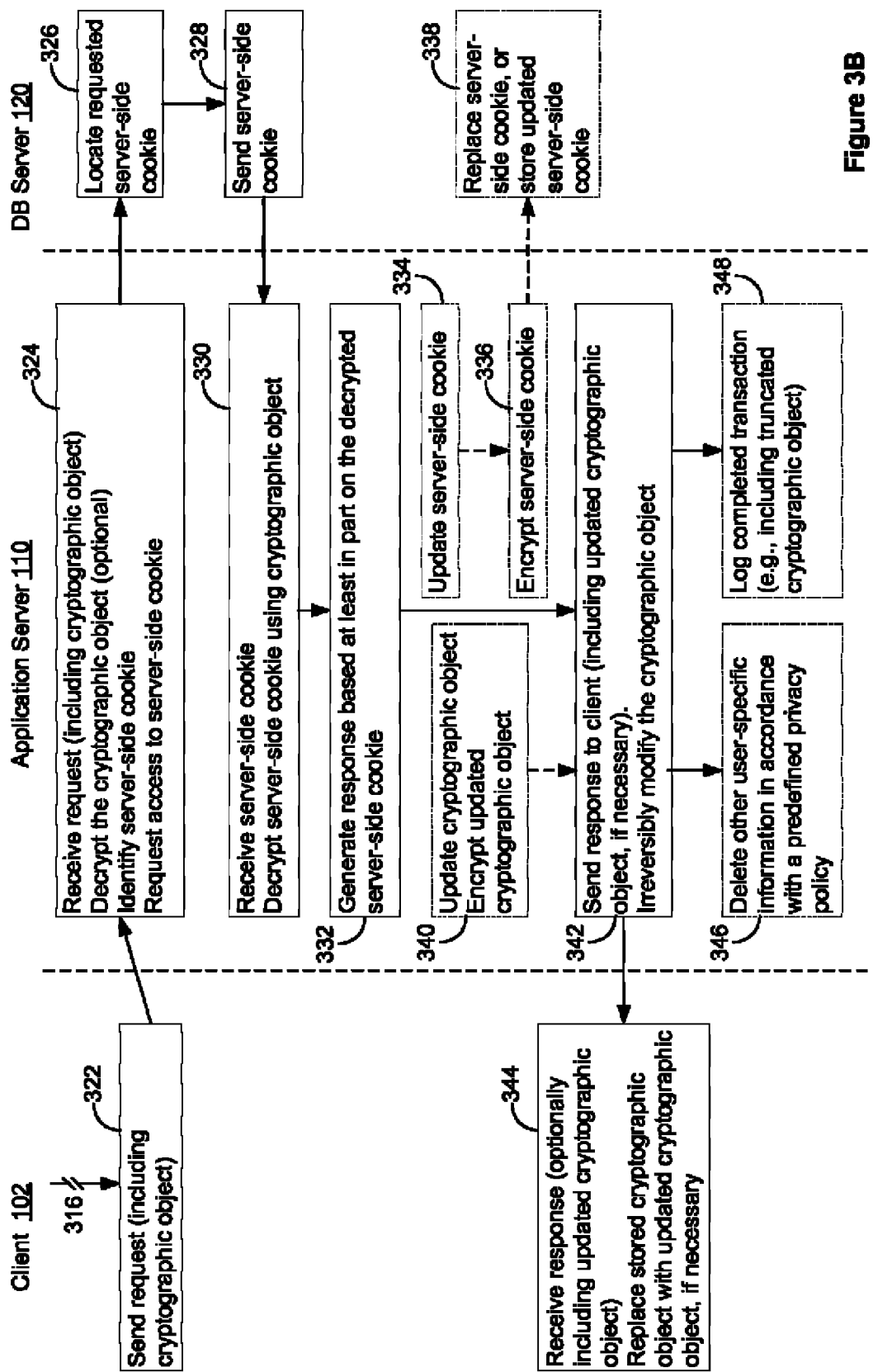

Attention is now directed to FIGS. 3A and 3B which are flow charts illustrating how the client system 102 interacts with the server system 106, as well as how the application server 110 and database server 120 interact with one another according to some embodiments of the invention. The front end server (not shown) 108 (in FIG. 1) passes messages received from the client system 102 to the application server 110 and passes messages to the client system 102 from the application server 110 via the communications network (not shown) 104. Although they are not shown in FIGS. 3A and 3B, the front end server and the communications network are used to pass messages between the application server 110 and the client system 102. The interactions start with the client system 102 sending a request (302) to the front end server (not shown) 108, which is received by the application server 110. Application server 110 generates a response and then generates a server-side cookie including some of the user-specific information (304). A server-side cookie as used herein refers to information that is stored on a server that can be related back to a particular user and can be used to generate a response to a request by the particular user, as described in more detail below with reference to FIG. 4.

In some embodiments the application server 110 then generates a cryptographic object and cryptographically protects the server-side cookie (306). In some embodiments, a cryptographic object contains a cryptographic key that is used to encrypt the server-side cookie, as discussed in greater detail below. Once the server-side cookie has been cryptographically protected (e.g., encrypted), the cryptographically protected server-side cookie may be stored (308) in the database server 120. In some embodiments the cryptographic object itself may optionally be encrypted (310) in order to prevent or detect any tampering with the cryptographic object, and to prevent access to a cryptographic key in the cryptographic object. Preventing access to the cryptographic key also prevents tampering with or accessing the user-specific data in the cryptographically protected server-side cookie. For example, encryption of the cryptographic object can be used to protect against snooping client systems and "man-in-the-middle" attacks, so that even if an unauthorized user gains access to an encrypted cryptographic object, they cannot determine the content of the cryptographic object and cannot generate use the encrypted cryptographic object to generate a new, valid (e.g., functional) cryptographic object.

In some embodiments a symmetric key is used for the encryption (and the subsequent decryption) of the cryptographic object (310), while in other embodiments a public-private key pair is used, where one key is used for encryption and the other key is used for decryption of the cryptographic object. In one embodiment the private key is used for encryption and the public key is used for decryption. In an alternate embodiment the public key is used for encryption and the private key is used for decryption. In either embodiment the keys may be kept within the server system (e.g., never communicated to any client system) in order to prevent access to the contents of the encrypted cryptographic object. When a public-private key pair is used, both the public key and the private key may be stored on the application server 110 (FIG. 1). Alternately, the public key may be stored on the application server 110 while the private key is stored on a separate server, as discussed in more detail below with respect to FIG. 9. The encryption (and decryption) of the cryptographic object may be performed using a cryptographic key or key pair that is not unique to the user or session or cookie (e.g., all cryptographic objects could be encrypted using the same key or key pair, so long as the key or key pair is known only to servers in the server system 106). A unique key or key pair (for each server-side cookie) is not needed when the key is not shared with client systems, because, in this embodiment, the encryption of the cryptographic object prevents access to the contents of the cryptographic object by users outside of the server system 106 (FIG. 1). In addition, it is noted that in this context, the "public key" of the public-private key pair is not truly "public," because it is known only to servers within the server system and in particular it is not known and is not accessible by the client systems 102.

According to some embodiments the application server 110 may send a response to the client system 102, the response including the cryptographic object, and in conjunction with sending this response, the server may also irreversibly modify the cryptographic object (312), as discussed above in greater detail above with reference to FIG. 2. This irreversible modification may be in accordance with a predefined privacy policy, as discussed above in greater detail with reference to FIG. 2. In some embodiments, the client system 102 receives the response from the application server 110 and stores the cryptographic object at the client system (314). The cryptographic object stored at the client system may be used by the client system 102 in a subsequent interaction with the application server 316. In some embodiments, the cryptographic object is a sent to the client system 102 as a client-side cookie, and thus the cryptographic object is stored by the client system 102 in a client cookie repository at the client system 102. The client cookie repository is sometimes called a cookie cache. The cryptographic object is typically stored in the client cookie repository by the browser application (on the client system) that sent the request and that received the response to the request.

In some embodiments, after the message has been sent, the application server 110 may also, optionally, delete other user-specific information from the application server 110 in accordance with a predefined privacy policy (318). The information deleted in accordance with the predefined policy may be unencrypted or decrypted user-specific information that was stored on the server, including information that was used by the application server 110 to generate a response. Additionally, the application server 110 may log the completed transaction (320). In some embodiments the irreversibly modified cryptographic object (or irreversibly modified cryptographic key) is logged as part of logging the transaction.

In some embodiments, at some point in time after the client system 102 has received and stored the cryptographic object 316, the client system 102 may send a request (including the cryptographic object) (322) to the application server 110. The application server 110 may receive the request (including the cryptographic object). In some embodiments, if the cryptographic object has been encrypted, as discussed above with reference to FIG. 3A, when the application server 110 receives the encrypted cryptographic object (client-side cookie) in conjunction with a request received from a client system the application server decrypts the encrypted cryptographic object using a cryptographic key, as discussed in greater detail below. In some embodiments the application server 110 may then identify the server-side cookie that is associated with the cryptographic object and request access to that server-side cookie from the database server 120 (324). The database server may locate the requested server side cookie (326) in a database and then send the server-side cookie (328) to the application server 110. Once the application server 110 has received the server side cookie it decrypts the server-side cookie using the cryptographic object (330). In some embodiments, the application server 110 generates a response to the user's request based at least in part on the decrypted server side cookie (332).

In some embodiments, the application server may update the server-side cookie (334). This may happen any time additional information needs to be added or removed from the server-side cookie, typically in conjunction with generating a response to the request. For example, in some embodiments, the server side cookie may be updated (334) when the user provides new user-specific information to the application server 110 in the request, or the server-side cookie may be updated when the application server 110 creates new information, such as a new version identifier or time/date indicator for the server-side cookie. In some embodiments the server-side cookie may be updated when information in the cookie expires or is scheduled for deletion based on a predefined privacy policy. It should be noted that generating a response to some requests may not cause the corresponding server-side cookie to be updated. For example, processing a request for information may require reading of the information in a server-side cookie, without requiring modification of the server-side cookie. In some embodiments, if the server-side cookie is updated, it is encrypted (336) by the application server 110 using the cryptographic object. The new server-side cookie is sent to the database server 120, which stores the new server-side cookie (338). Optionally, the new server-side cookie is stored by the database server 120 along with the previous server-side cookie (338). In other embodiments the previous server-side cookie is replaced by the new server-side cookie (338).

In some embodiments the cryptographic object may be updated, and the updated cryptographic object may be encrypted as described above (340). The cryptographic object may be updated (340) for a number of reasons. In some embodiments the cryptographic object is updated to change the cryptographic key. Updating the cryptographic key generally requires updating or replacing the server-side cookie (334), which is encrypted with the updated cryptographic key (336) and then stored by the database server 120 (338). In some embodiments the cryptographic object includes version information such as a version identifier; and the cryptographic object may be updated (340) to change the version number.

In some embodiments the version number is used by the server system 106 (FIG. 1) to identify possible unauthorized access to the cryptographically protected information. In some embodiments the server system (e.g., the database server 120) may store the most current version identifier for the cryptographic object. If the server system 106 receives a request with a cryptographic object that contains a version number that is not the current version, a previous version of the cryptographic object may have been intercepted by a third party who is now attempting to access the cryptographically protected information. Alternatively, receiving a cryptographic object that is not the current version may mean that there was an error with the response to the client system containing the current version of the cryptographic object (e.g., due to a transmission error, the client system never received the current version of the cryptographic object). Thus, in embodiments where there is version information associated with the cryptographic object, the server system may have additional options for detecting possible unauthorized access to the cryptographically protected information.

For example, when the version identifier in the cryptographic object received from the client system 102 does not match a corresponding version value stored in the system, a remedial action is performed by the system. In accordance with some embodiments the server system 106 might perform the remedial action of deleting the server-side cookie associated with the cryptographic object. In other embodiments, the server system 106 might create a new server-side cookie that is a duplicate of the old server-side cookie and send the client system 102 a new cryptographic object that is associated with the new server-side cookie. In some embodiments, the server system 106 requires verification that the requestor is the user or owner of the information in the server-side cookie associated with the cryptographic object, and only upon receiving such verification, sending the client system 102 an updated cryptographic object with a current version number.

Whether or not there is version information in the cryptographic objects, a server system 106 may still be able to detect possible unauthorized access if two cryptographic objects that are associated with the same cryptographically protected information are received at or near to the same time from different users. For example, a server system 106 might receive from a first client system 102 a first request having a first cryptographic object. The server system 106 might also receive from a second client system 102, distinct from the first client system 102, a second request having a second cryptographic object. The server system could then determine whether the first cryptographic object and the second cryptographic object both correspond to (the same) first cryptographically protected information. If the server system 106 does determine that the first cryptographic object and the second cryptographic object both correspond to the first cryptographically protected information, the server system 106, in accordance with some embodiments, performs a remedial operation on the first cryptographically protected information. In some embodiments, the remedial action is performed as part of operations 340, 334 and 336 (FIG. 3B).

In one example, the remedial operation is to replicate the first cryptographically protected information to produce second cryptographically protected information and associate with the second cryptographically protected information a new cryptographic object that is distinct in value from the first and second cryptographic objects. As a result, two entries in the server-side cookie database 402 (FIG. 4) now exist where before there was one. In this embodiment the new cryptographic object would at least have a distinct unique identifier, and it may also have a cryptographic key value distinct from the value of the cryptographic key associated with the first cryptographically protected information. In these embodiments the server system 106 sends the first cryptographic object and a response based at least in part on the first cryptographically protected information to the first client system 102. The server system 106 also sends the updated cryptographic object and a response based at least in part on the second cryptographically protected information to the second client system 102. In these embodiments, the privacy of the first cryptographically protected information is protected from the second client system in that any changes made to the first cryptographically protected information after the remedial action (i.e., changes made through requests from the first client system, using the first cryptographic object) is not accessible by the second client system because the new cryptographic object includes an identifier that points to a different entry in the server-side cookie database than the entry pointed to by the first cryptographic object.

Optionally, to further ensure that the second client system cannot access changes to the first cryptographically protected information after the remedial action, the remedial action includes replacing the first cryptographic object with a new first cryptographic object, re-encrypting the first cryptographically protected information with the new first cryptographic object, storing the re-encrypted information back in the database, and returning (342) the new first cryptographic object to the first client system along with the response to the request (322, 324) from the first client system. In this way, even if the second client system retains a copy of the second cryptographic object (i.e., fails to delete it when it receives the updated cryptographic object in the response from the server), that second cryptographic object is now inoperative for accessing the first cryptographically protected information.

In some other embodiments, the remedial action is to delete the cryptographically protected information from the server system 106, rather than replicating it. Whether the cryptographically protected information is deleted or replicated may be determined by a predefined privacy policy. For instance, if the cryptographically protected information includes highly sensitive user-specific information (e.g., credit card numbers or social security numbers), then the cryptographically protected information may be deleted. In contrast, if the cryptographically protected information contains no user-specific information or user-specific information deemed to be not highly sensitive (e.g., shopping cart contents, or the URL(s) of the last page(s) visited on a particular website), the cryptographically protected information may be duplicated rather than deleted.

In some embodiments, after the response is generated by the application server 110, the application server sends the response to the client system 102. The response may include an updated cryptographic object, if the cryptographic object was updated by the application server 110 (342). Additionally, in conjunction with sending the response to the client system 102, the cryptographic object may be irreversibly modified to render it unusable for accessing (e.g., decrypting) the cryptographically protected information (342), as discussed in greater detail above. In some embodiments the response, which may include an updated cryptographic object, is received by the client system 102. When the response includes an updated cryptographic object, the client system 102 replaces the currently stored cryptographic object with the updated cryptographic object (334). It is noted that the server system 106 generally cannot prevent the client system 102 from improperly retaining a copy of the currently stored cryptographic object. However, normal operation of the browser application in the client system 102 would cause the currently stored cryptographic object to be replaced with the updated cryptographic object. In addition, in most or all embodiments, the currently stored cryptographic object becomes inoperative when the updated cryptographic object is generated and sent to the client system.

If the cryptographic object is not updated, it may be unnecessary for the client system 102 to replace the stored cryptographic object. In some embodiments, after the message has been sent to the client system 102, the application server 110 may also, optionally, delete other user-specific information in accordance with a predefined privacy policy (346). The information deleted in accordance with the predefined policy may be unencrypted or decrypted user-specific information that was stored on the application server 110 or other servers on the server system 106 (FIG. 1), including information that was used by the application server 110 to generate a response. The purpose of deleting this information is to protect the privacy of the user by preventing reconstruction of the cryptographic object or the server-side cookie or any other traces of user-specific information that remain on the application server 110 after the response has been generated and sent to the client system 102. The application server 110 may also log the completed transaction (348). In some embodiments the irreversibly modified (as described in greater detail above) cryptographic object is logged as part of logging the transaction. For example, the irreversibly modified cryptographic object is included in an entry in the transaction log along with the details of the logged transaction (e.g., date, time, IP address, etc.).

FIGS. 3A-3B contain a flowchart representing a method for privacy enhancement of server side cookies, according to certain embodiments of the invention. This method may be governed by instructions that are stored in a computer readable storage medium and that are executed by one or more processors of one or more servers. Each of the operations shown in FIGS. 3A-3B may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 4:
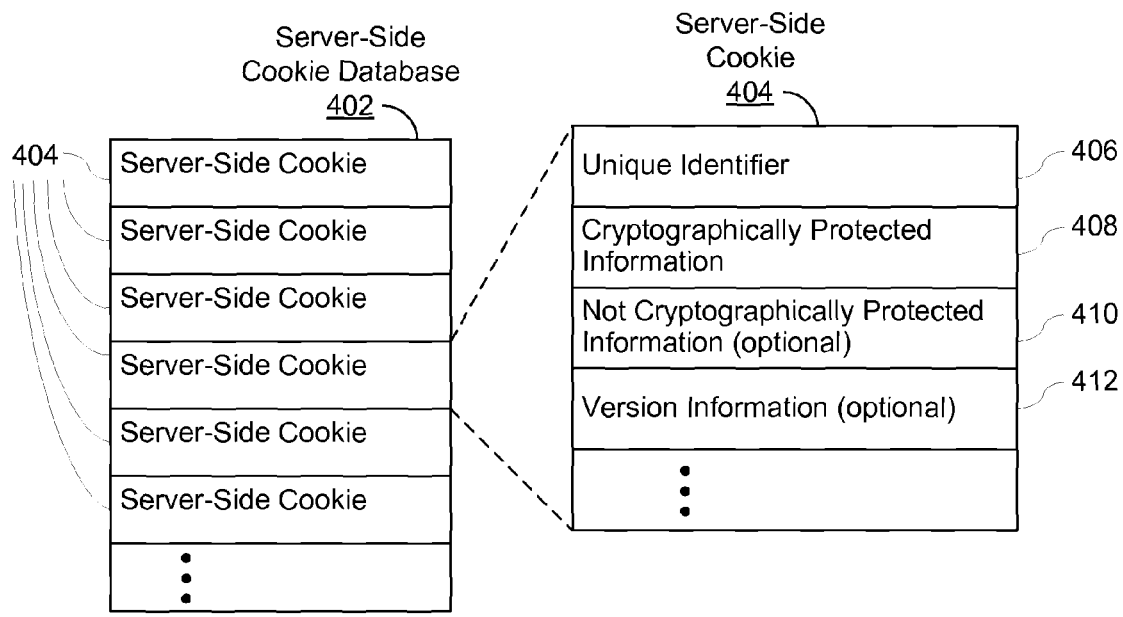
FIG. 4 is a block diagram illustrating data structures associated with a server-side cookie in accordance with some embodiments.

Attention is now directed to FIG. 4, illustrating data structures associated with a server-side cookie in accordance with some embodiments, including a server-side cookie database 402 containing one or more server-side cookies 404. In some embodiments a server-side cookie database 402 is included in the server system 106 (FIG. 1). The server-side cookie database 402 may be located in the database server 120 (FIG. 1), the application server 110 (FIG. 1) or some other server in the server system 106. Server-side cookies 404 are stored in the server-side cookie database 402. Optionally, the location of a particular server-side cookie 404 may be determined or referenced by a map function or a look-up function. In some embodiments the server-side cookie 404 may include the following fields, or a superset or a subset thereof:

a unique identifier 406, which specifies, or provides the information needed to identify, the location of a particular server-side cookie 404 (also called an entry) in the database 402; the unique identifier 406 may be used by the look-up function or the map function to locate the server-side cookie 404 in the server-side cookie database 402;

cryptographically protected information 408, which may include user-specific information that has been cryptographically protected based on a predefined privacy policy;

(optional) not cryptographically protected information (e.g., clear text information) 410, which, if included in the server-side cookie 404, may include user-specific information that does not need to be cryptographically protected based on a predefined privacy policy and/or system information about the server-side cookie, such as a time/date stamp; and (optional) version information 412, which, if included in the server-side cookie 404, may include a version identifier or version number and may be used to determine whether a server-side cookie 404 stored in the server-side cookie database 402 is the current version of the server-side cookie 404.

Figure 5:
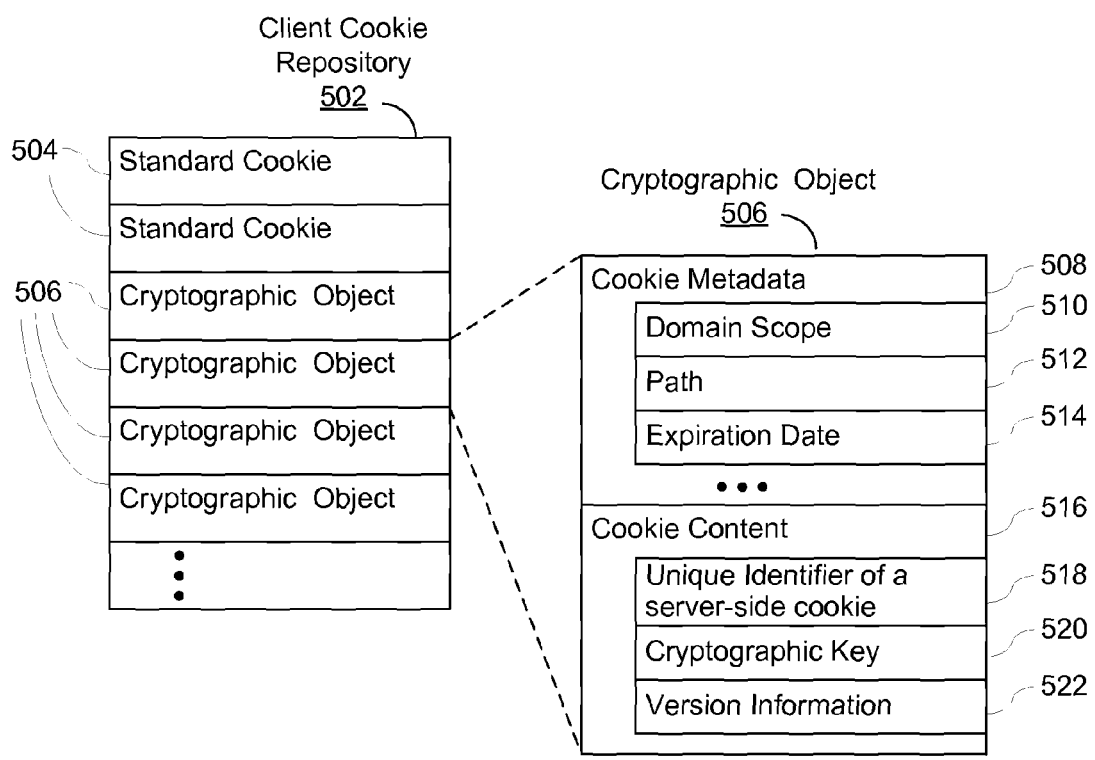
FIG. 5 is a block diagram illustrating data structures associated with a cryptographic object in accordance with some embodiments.

Attention is now directed to FIG. 5, which is a block diagram illustrating data structures associated with a cryptographic object in accordance with some embodiments, including: a client cookie repository 502, which may contain one or more client-side cookies, such as standard cookies 504 and/or cryptographic objects 506. In some embodiments, the client cookie repository is included in the client system 102

(FIG. 1). A standard cookie 504 (also known as a "web cookie" or an "HTTP cookie") is a packet of data sent by a server system to a client system for the purpose of storing and retrieving information about the client system and interactions between the client system and the server system. In some embodiments all client-side cookies (including standard cookies and cryptographic objects) are associated with metadata indicative of information about the client-side cookie. The metadata 508 included in a client-side cookie may include data values specified by a network communication standard. As used herein, a standard cookie 404 refers to any kind of client-side cookie that is not a cryptographic object 406. In some embodiments, a cryptographic object is a special type of client-side cookie having data that allows access to information stored on the server system in a server-side cookie. In accordance with this embodiment, the cryptographic object may still conform to network communication standards for client-side cookies. In some embodiments the cryptographic object 506 may include the following fields, or a superset or a subset thereof:

cookie metadata 508, which may include:
   domain scope 510, which may indicate the domain of a server system that sent the cryptographic object 506 to the client system 102;
   path 512, which may indicate the part of the directory structure of the server system that uses the cryptographic object 506;
   expiration date 514, which may indicate when, if ever, the cryptographic object 506 is to be discarded, replaced or updated; and
   other data specified by network communication standards for client-side cookies.
cookie contents 516, which may include:
   a unique identifier 518 of a server-side cookie 404, which may be used by the server system 106 to identify the location of a particular server-side cookie 404 in the server-side cookie database 402 using a map function or a look-up function; the unique identifier 518 in an cryptographic object 506 will typically match the unique identifier 406 of a corresponding server-side cookie 404;
   a cryptographic key 520 which may be used by the server system 106 to access (decrypt) the corresponding encrypted server-side cookie 404 stored in the server-side cookie database 402; the cryptographic key 520 may be a symmetric key, such as a key that is compatible with AES-128, AES-192, AES-256, Triple DES, or Twofish; and
   version information 522, which may optionally include a version identifier or version number, and may be used to determine whether a remedial action should be taken by the server system as discussed in greater detail above with reference to FIG. 3B.

Figure 6:
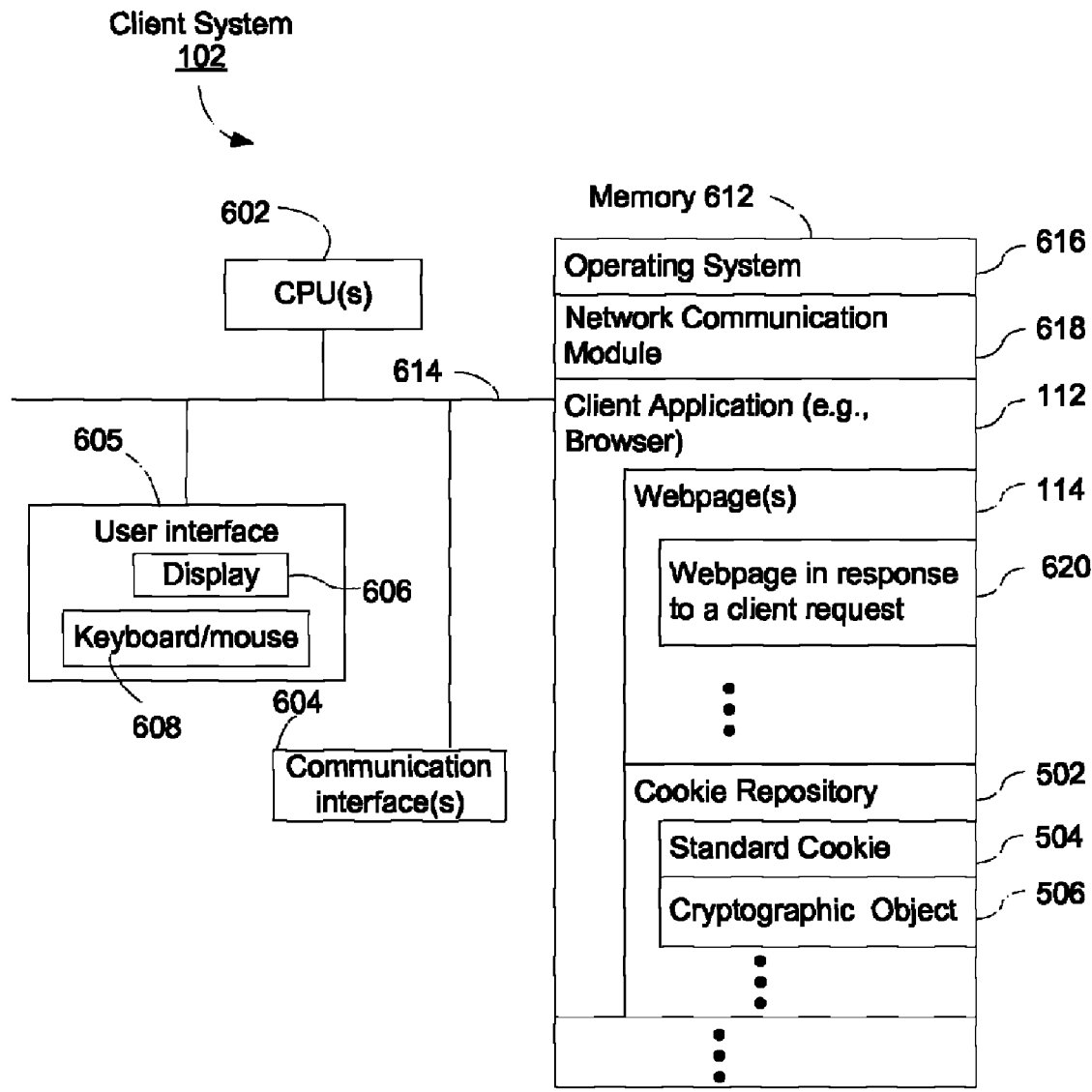
FIG. 6 is a block diagram illustrating the structure of an exemplary client system in accordance with some embodiments.

Attention is now directed to FIG. 6, which is a block diagram illustrating a client system 102 in accordance with one embodiment of the present invention. The client system 102 typically includes one or more processing units (CPUs) 602, one or more network or other communications interfaces 604, memory 612, and one or more communication buses 614 for interconnecting these components. The client system 102 optionally may include a user interface 605 comprising a display device 606 and a keyboard/mouse 608. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a computer readable storage medium. In some embodiments, memory 612 or the computer readable storage medium of memory 612 stores the following programs, modules and data structures, or a subset thereof:

an operating system 616 that includes procedures for handling various basic system services and for performing hardware dependent tasks;
a network communication module 618 that is used for connecting the client system 102 to other computers via the one or more communication network interfaces 604 (wired or wireless) and one or more communication networks, such as the Internet, other wide area networks, local area networks, metropolitan area networks, and so on;
a client application (or instructions) 112, such as a web browser application, for receiving a user request for a webpage and rendering the requested webpage on the display device 606 or other user interface device;
one or more requested webpages 114, which may include, a webpage 620 received in response to a client system request to a server system; and
a cookie repository 502 for storing client-side cookies (including one or more standard cookies 504 and/or cryptographic objects 506) sent by various servers systems to the client system 102.

Although FIG. 6 shows a "client system 102" the client system described in this Figure is intended more as functional description of the various features which may be present in a client system 102 than as a structural schematic of the embodiments described herein. In practice, and as recognized by those of ordinary skill in the art, items shown separately could be combined and some items could be separated. For example, the client application 112 may be integrated with the operating system 616 in some embodiments. In some embodiments, various functions of the client application 112 may be performed by two or more separate applications.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Figure 7:
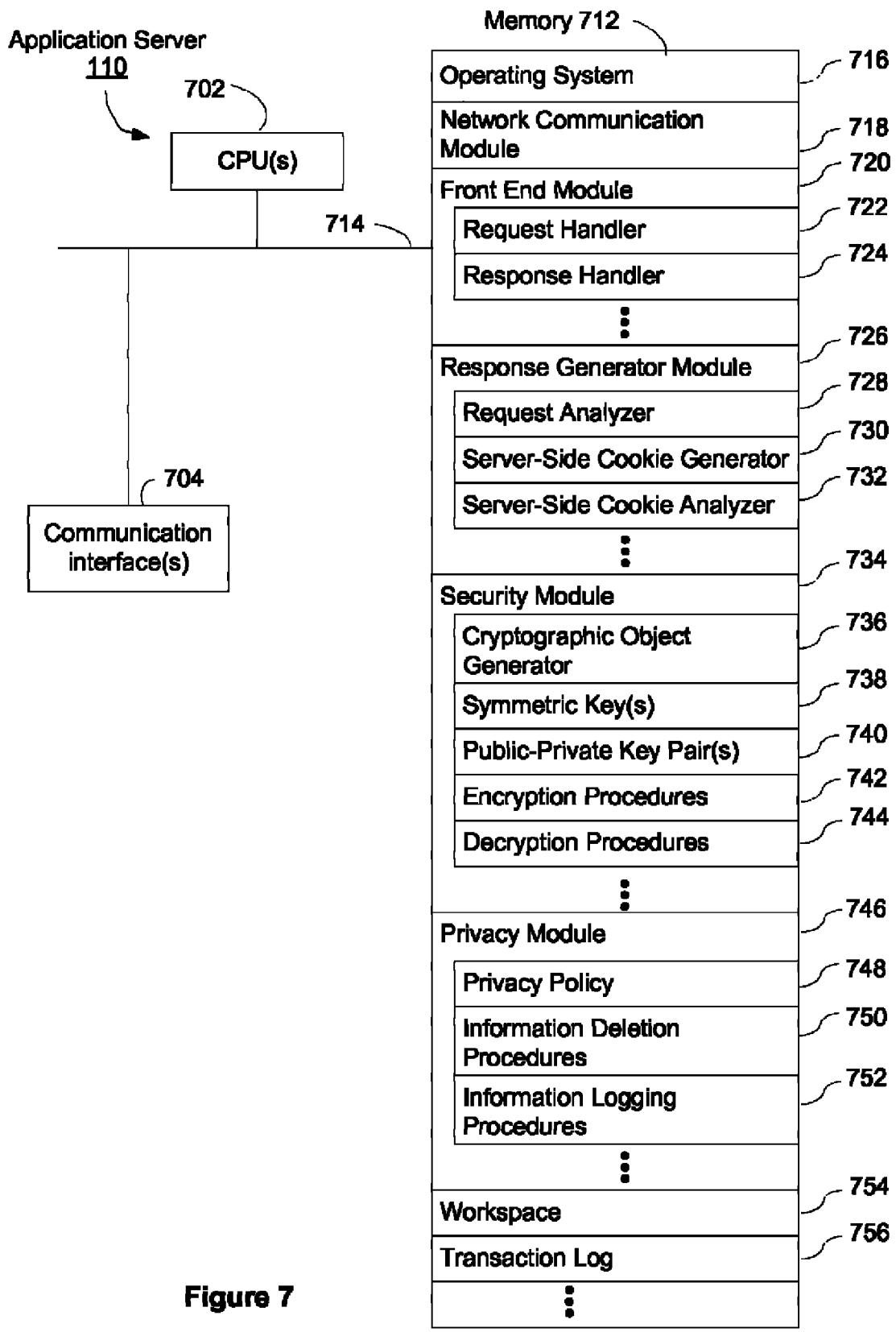
FIG. 7 is a block diagram illustrating the structure of an exemplary application server system in accordance with some embodiments.

Attention is now directed to FIG. 7, which is a block diagram illustrating an application server 110 in accordance with one embodiment of the present invention. The application server 110 typically includes one or more processing units (CPUs) 702, one or more network or other communications interfaces 704, memory 712, and one or more communication buses 714 for interconnecting these components. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a computer readable storage medium. In some embodiments, memory 712 or the computer readable storage medium of memory 712 stores the following programs, modules and data structures, or a subset thereof:
- an operating system 716 that includes procedures for handling various basic system services and for performing hardware dependent tasks;
- a network communication module 718 that is used for connecting the application server 110 to other computers via the one or more communication network interfaces 704 (wired or wireless) and one or more communication networks, such as the Internet, other wide area networks, local area networks, metropolitan area networks, and so on;
- a front end module 720 that passes communications between the application server 110 and client systems 102, the front end module can also be used in conjunction with or instead of a separate front end server 108 (FIG. 1); in some embodiments, the front end module 720 includes a request handler 722 for receiving requests from a client system 102 (in FIG. 1) and a response handler 724 for passing requests from the application server 110 to the client system 102;
- a response generator module 726 that prepares responses to requests that are received from the client system 102; the responses may be prepared based at least in part on the contents of a server-side cookie 404 (FIG. 4); in some embodiments the response generator module 726 includes one or more of the following:
  - a request analyzer 728 for analyzing requests received from a client system 102,
  - a server-side cookie generator 730 for generating a new server-side cookie 404 when no server-side cookie exists or for updating a server-side cookie when information is to be added to or deleted from the server-side cookie, and
  - a server-side cookie analyzer 732 for analyzing the contents of the server-side cookie where the contents of the server-side cookie 404 may include user-specific information;
- a security module 734 for performing security procedures including the encryption and decryption of data; in some embodiments the security module 734 includes one or more of the following:
  - a cryptographic object generator 736 which may be used to generate new cryptographic objects 506 (FIG. 5), including cryptographic keys which may be used to cryptographically protect (e.g., encrypt) server-side cookies and access (e.g., decrypt) the cryptographically protected server-side cookies,
  - one or more symmetric keys 738 for encrypting and decrypting the cryptographic object 506 in order to prevent unauthorized access or modifications to the cryptographic object or the contents of the cryptographic object such as the cryptographic key,
  - public-private key pair(s) 740 may be provided, in addition to, or instead of the symmetric key(s) 738, for encrypting and decrypting cryptographic objects, where in some embodiments, one key of the public-private key pair (e.g., the private key) is used to encrypt cryptographic objects and the other key of the public-private key pair (e.g., the public key) is used to decrypt the cryptographic objects; in some embodiments the application server 110 has both the public key and the private key, while in other embodiments the application server 110 has only the public key, which is used to decrypt any encrypted cryptographic objects (in this embodiment, cryptographic objects may be encrypted by a separate server that has access to the private key),
  - encryption procedures 742 which use cryptographic keys to cryptographically protect both server-side cookies 404 and cryptographic objects 506, and
  - decryption procedures 744 which may be used to access (e.g., decrypt) both cryptographically protected server-side cookies and encrypted cryptographic objects (client-side cookies);
- a privacy module 746 for performing operations in accordance with privacy procedures and/or instructing other modules to perform operations in accordance with privacy procedures, the privacy procedures may include one or more of the following:
  - a privacy policy 748 that specifies what categories of user-specific information are particularly sensitive and how information in each category should be handled (e.g., stored in an unencrypted form, encrypted and stored, deleted, logged, etc.); in some embodiments the privacy policy is implemented in information deletion procedures 750 and information logging procedures 752; in some embodiments the privacy policy is not stored as a separate file or procedure;
  - information deletion procedures 750 that delete information from the server system 106 (in accordance with the aforementioned privacy policy); for example the information deletion procedures 748 may delete any information over 6 months old as well as any unencrypted user-specific information that is not currently in use by the server system 106; the deletion procedures 750 may also be used to delete or irreversibly modify any cryptographic object 506 not currently in use by the application server 110, as described in greater detail above; alternately, deletion or irreversible modification of cryptographic objects may be handled by the information logging procedures 752; and
  - information logging procedures 752 that log information about transactions (e.g., requests received, responses sent, etc.) handled by the application server 110, in accordance with the aforementioned privacy policy;
- a workspace 754 for storing information that is being operated on by the modules in the application server 110; for example, when a server-side cookie 404 has been accessed (e.g., decrypted), the decrypted information may be stored in the workspace 754 while the response generator module 726 is analyzing the contents of the server-side cookie 404 and generating a response; in some embodiments all unencrypted information (e.g., all unencrypted user-specific information) that is stored in the workspace 754 is deleted from the workspace 754 in accordance with the privacy policy 748 once a response has been sent to the client system 102 (FIG. 1); and
- a transaction log 756 for recording information about transactions between the server system 106 and the client system 102; in some embodiments each transaction with a client system 102 is logged, while in other embodiments only particularly important transactions are logged; transactions may be logged using any value that identifies (uniquely or semi-uniquely) the transaction or the client system 102 (e.g., logging a transaction using an irreversibly modified cryptographic object or irreversibly modified cryptographic key and a value indicative of the date/time of the transaction).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Figure 8:
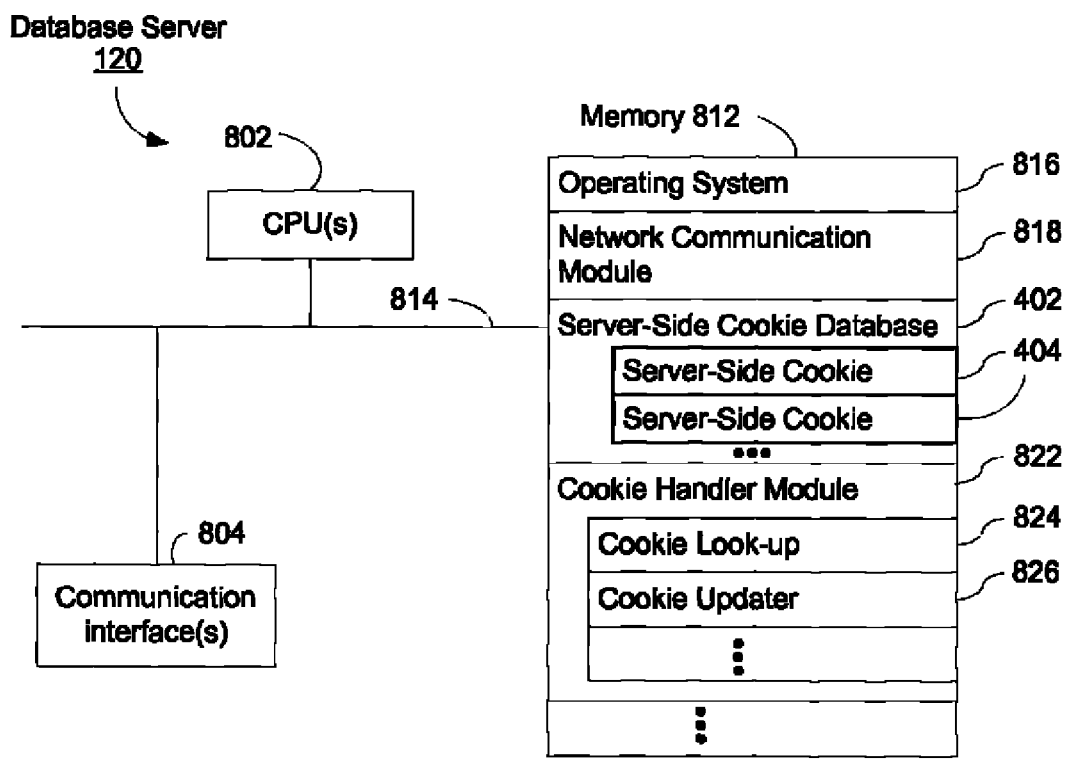
FIG. 8 is a block diagram illustrating the structure of an exemplary database server in accordance with some embodiments.

Attention is now directed to FIG. 8, which is a block diagram illustrating a database server 120 in accordance with one embodiment of the present invention. The database server 120 typically includes one or more processing units (CPUs) 802, one or more network or other communications interfaces 804, memory 812, and one or more communication buses 814 for interconnecting these components. Memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices remotely located from the CPU(s) 802. Memory 812, or alternately the non-volatile memory device(s) within memory 812, comprises a computer readable storage medium. In some embodiments, memory 812 or the computer readable storage medium of memory 812 stores the following programs, modules and data structures, or a subset thereof:

- an operating system 816 that includes procedures for handling various basic system services and for performing hardware dependent tasks;
- a network communication module 818 that is used for connecting the database server 120 to other computers via the one or more communication network interfaces 804 (wired or wireless) and one or more communication networks, such as the Internet, other wide area networks, local area networks, metropolitan area networks, and so on;
- a server side cookie database 402 for storing cryptographically protected server-side cookies 404, as described in greater detail above with reference to FIG. 4; and
- a cookie handler module 822 that is used for managing the server-side cookies 404 in the server-side cookie database 402.

In some embodiments, the cookie handler module 822 includes:

- a cookie look-up 824 for identifying server-side cookies 404 in the server-side cookie database 402 by matching the unique identifier 518 (FIG. 5) in a cryptographic object 506 to the unique identifier 406 (FIG. 4) in a server-side cookie 404; and
- a cookie updater 826 for updating server-side cookies 404, in some embodiments a server-side cookie is updated whenever the database server 120 receives a server-side cookie from the application server 110 that has the same unique identifier as the corresponding server-side cookie in the server-side cookie database 402; in other embodiments the server-side cookie in the server-side cookie database 402 is only updated if the received server-side cookie has the same unique identifier and a higher version number than the stored server-side cookie.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 812 may store a subset of the modules and data structures identified above. Furthermore, memory 812 may store additional modules and data structures not described above.

Figure 9:
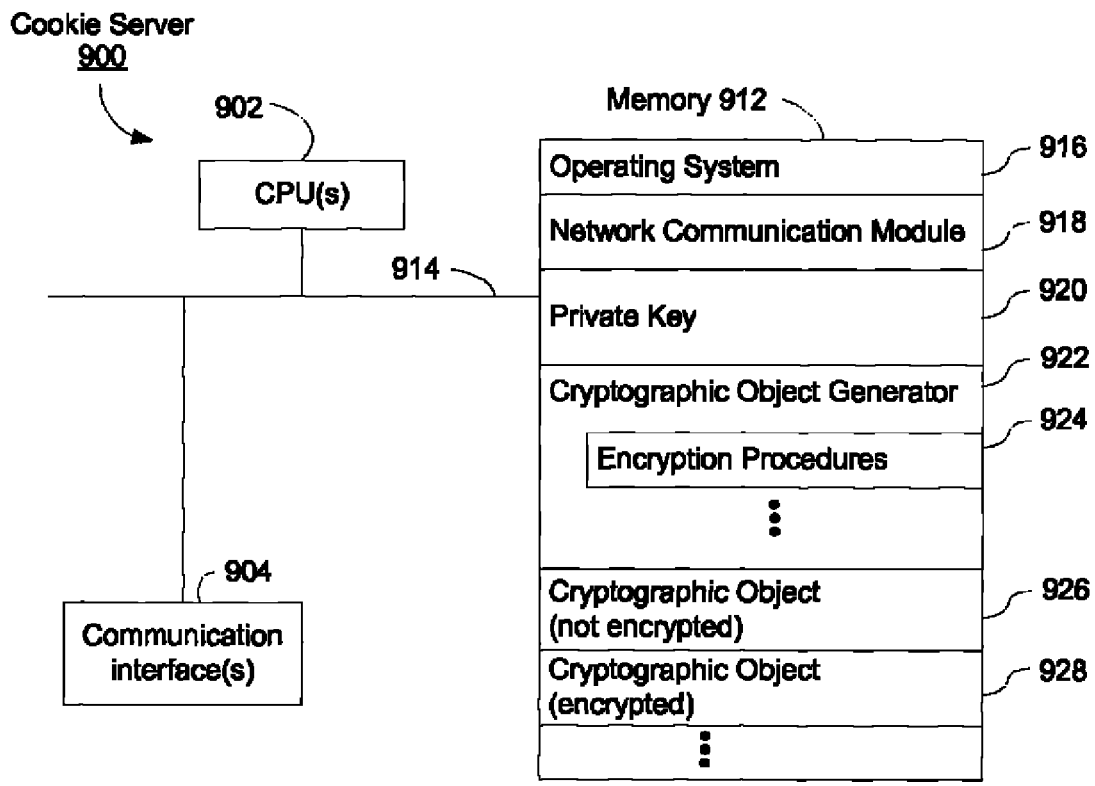
FIG. 9 is a block diagram illustrating the structure of an exemplary cookie server in accordance with some embodiments.

Attention is now directed to FIG. 9, which is a block diagram illustrating a cookie server 900 in accordance with one embodiment of the present invention. Since a primary function of the cookie server 900 is encryption of client-side cookies (e.g., using a private key), the cookie server 900 may also be called an encryption server. The cookie server 900 typically includes one or more processing units (CPUs) 902, one or more network or other communications interfaces 904, memory 912, and one or more communication buses 914 for interconnecting these components. Memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 912 may optionally include one or more storage devices remotely located from the CPU(s) 902. Memory 912, or alternately the non-volatile memory device(s) within memory 912, comprises a computer readable storage medium. In some embodiments, memory 912 or the computer readable storage medium of memory 912 stores the following programs, modules and data structures, or a subset thereof:

- an operating system 916 that includes procedures for handling various basic system services and for performing hardware dependent tasks;
- a network communication module 918 that is used for connecting the cookie server 900 to other computers via the one or more communication network interfaces 904 (wired or wireless) and one or more communication networks, such as the Internet, other wide area networks, local area networks, metropolitan area networks, and so on;
- a private key 920 for encrypting cryptographic objects in accordance with some embodiments, in some embodiments the private key 920 may be part of a private/public key pair where the public key is used by another server such as an application server 110 (FIG. 1) to decrypt an encrypted cryptographic object;
- a cryptographic object generator 922 for generating cryptographic objects using encryption procedures 924. In some embodiments the cookie server 900 generates a cryptographic object, encrypts it with the private key 920 and then sends the encrypted cryptographic object to the application server 110. In other embodiments the application server 110 may send the cookie server 900 an unencrypted cryptographic object and the cookie sever 900 may then encrypt the cryptographic object and send the encrypted cryptographic object to the application server 110. The encrypted cryptographic object is sometimes called a client-side cookie;

a cryptographic object (not encrypted) 926 before the encryption procedures 924 have been performed on the cryptographic object; and a cryptographic object (encrypted) 928 (also called a client-side cookie) after the encryption procedures 924 have been performed on the cryptographic object.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 912 may store a subset of the modules and data structures identified above. Furthermore, memory 912 may store additional modules and data structures not described above.

Although FIGS. 7-9 show three separate servers: an "application server 110" (FIG. 7), "database server 120" (FIG. 8) and a "cookie server 900" (FIG. 9), the servers described in these figures are intended more as functional description of the various features which may be present in a server system than as a structural schematic of the embodiments described herein. In practice, and as recognized by those of ordinary skill in the art, items shown separately could be combined and some items could be separated. For example, some items shown separately in FIGS. 7-9 could be implemented on single servers and single items could be implemented by one or more servers. The actual number and types of servers used to implement an server system 106 (FIG. 1) and how features are allocated among them will vary from one implementation to another, and may depend in part on the amount of data traffic that the system must handle during peak usage periods as well as during average usage periods.

Each of the methods described herein may be governed by instructions that are stored in a computer readable storage medium and that are executed by one or more processors of one or more server systems 106 or client systems 102. Each of the operations shown in FIGS. 2, 3A, and 3B may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of accessing cryptographically protected information comprising, on a server system:

receiving a request from a client system, the request including a cryptographic object; processing the request by:

identifying, at the server system, cryptographically protected information associated with the cryptographic object;

accessing the cryptographically protected information using the cryptographic object;

sending, to the client system, data based at least in part on the cryptographically protected information; and in conjunction with completing processing of the request, irreversibly modifying the cryptographic object on the server system; wherein irreversibly modifying the cryptographic object on the server system comprises truncating the cryptographic object on the server system to generate a truncated cryptographic object.

2. The method of claim 1, wherein irreversibly modifying the cryptographic object is performed in accordance with a predefined privacy policy.

3. The method of claim 1, further comprising: in conjunction with completing processing of the request, deleting other user-specific information from the server system in accordance with a predefined privacy policy.

4. The method of claim 1, including, prior to receiving the request:

storing, at the server system, the cryptographically protected information associated with the cryptographic object;

sending to the client system the cryptographic object; and in conjunction with sending the cryptographic object to the client system, irreversibly modifying the cryptographic object on the server system.

5. The method of claim 1, wherein the cryptographic object includes a unique identifier and a key value; and the method includes:

identifying the cryptographically protected information using the unique identifier; and accessing the cryptographically protected information using the key value.

6. The method of claim 5, wherein the cryptographic object further includes a version identifier; and the method includes:

performing a remedial action when the version identifier in the cryptographic object does not match a corresponding version value stored in the server system.

7. The method of claim 5, wherein the cryptographic object is encrypted, and processing the request includes decrypting the cryptographic object to recover the unique identifier and key value of the cryptographic object.

8. The method of claim 1, wherein the cryptographic object is encrypted.

9. The method of claim 1, wherein processing the request includes logging information associated with the request, the logged information including the truncated cryptographic object.

10. The method of claim 1, wherein processing the request includes updating the cryptographically protected information based at least in part on actions taken by a user and storing the updated information.

11. The method of claim 1, further comprising:

receiving from a first client system a first request having a first cryptographic object;

receiving from a second client system, distinct from the first client system, a second request having a second cryptographic object;

determining whether the first cryptographic object and the second cryptographic object both correspond to first cryptographically protected information;

when the first cryptographic object and the second cryptographic object both correspond to the first cryptographically protected information, performing a remedial operation on the first cryptographically protected information.

12. The method of claim 11, wherein the remedial operation is to replicate the first cryptographically protected information to produce second cryptographically protected information and to associate with the second cryptographically protected information an updated cryptographic object that is distinct in value from the first and second cryptographic objects.

13. The method of claim 11, wherein the remedial operation is to delete the first cryptographically protected information.

14. A system for accessing cryptographically protected information comprising:
   memory
   one or more processors; and
   one or more modules stored in the memory, the one or more modules including instructions which when executed by the one or more processors cause the system:
   to process a request received from a client system, wherein the request includes a cryptographic object, by:
      identifying, at the server system, cryptographically protected information associated with the cryptographic object;
      accessing the cryptographically protected information using the cryptographic object;
      sending, to the client system, data based at least in part on the cryptographically protected information; and
      in conjunction with completing processing of the request, irreversibly modifying the cryptographic object on the server system; wherein irreversibly modifying the cryptographic object on the server system comprises truncating the cryptographic object on the server system to generate a truncated cryptographic object.

15. The system of claim 14, wherein the irreversibly modifying is performed in accordance with a predefined privacy policy.

16. The system of claim 14, wherein the one or more modules include instructions:
   to store at the server system, prior to receiving the request, the cryptographically protected information associated with the cryptographic object;
   to send to the client system the cryptographic object; and
   to irreversibly modify the cryptographic object on the server in conjunction with sending the cryptographic object to the client system.

17. The system of claim 14, wherein the cryptographic object includes a unique identifier and a key value; and the one or more modules include instructions:
   to identify the cryptographically protected information using the unique identifier; and
   to access the cryptographically protected information using the key value.

18. The system of claim 17, wherein the cryptographic object further includes a version identifier; and the one or more modules include instructions:
   to perform a remedial action when the version identifier in the cryptographic object does not match a corresponding version value stored in the server system.

19. The system of claim 17, wherein the cryptographic object is encrypted, and the instructions to process the request include instructions to decrypt the cryptographic object to recover the unique identifier and key value of the cryptographic object.

20. A non-transitory computer readable storage medium storing one or more programs for execution by one or more processors of a computer system, the one or more programs comprising instructions:
   to process a request received from a client system, wherein the request includes a cryptographic object, by:
      identifying, at the server system, cryptographically protected information associated with the cryptographic object;
      accessing the cryptographically protected information using the cryptographic object;
      sending, to the client system, data based at least in part on the cryptographically protected information; and
      in conjunction with completing processing of the request, irreversibly modifying the cryptographic object on the server system; wherein irreversibly modifying the cryptographic object on the server system comprises truncating the cryptographic object on the server system to generate a truncated cryptographic object.

21. The non-transitory computer readable storage medium of claim 20, wherein the irreversibly modifying is performed in accordance with a predefined privacy policy.

22. The non-transitory computer readable storage medium of claim 20, further comprising instructions:
   to store at the server system, prior to receiving the request, the cryptographically protected information associated with the cryptographic object;
   to send to the client system the cryptographic object; and
   to irreversibly modify the cryptographic object on the server in conjunction with sending the cryptographic object to the client system.

23. The non-transitory computer readable storage medium of claim 20, wherein the cryptographic object includes a unique identifier and a key value; and the computer readable storage medium further comprises instructions:
   to identify the cryptographically protected information using the unique identifier; and
   to access the cryptographically protected information using the key value.

24. The non-transitory computer readable storage medium of claim 23, wherein the cryptographic object further includes a version identifier; and the computer readable storage medium further comprises instructions:
   to perform a remedial action when the version identifier in the cryptographic object does not match a corresponding version value stored in the server system.

25. The non-transitory computer readable storage medium of claim 23, wherein the cryptographic object is encrypted, and the instructions to process the request include instructions to decrypt the cryptographic object to recover the unique identifier and key value of the cryptographic object.

* * * * *